US010429906B2

(12) United States Patent
Katukia

(10) Patent No.: US 10,429,906 B2
(45) Date of Patent: Oct. 1, 2019

(54) MOTION DETECTION CIRCUITS, AND ASSOCIATED METHODS

(71) Applicant: NXP B.V., Eindhoven (NL)

(72) Inventor: Mamuka Katukia, Waalre (NL)

(73) Assignee: NXP B.V., Eindhoven (NL)

(*) Notice: Subject to any disclaimer, the term of this patent is extended or adjusted under 35 U.S.C. 154(b) by 90 days.

(21) Appl. No.: 15/828,674

(22) Filed: Dec. 1, 2017

(65) Prior Publication Data

US 2018/0173280 A1 Jun. 21, 2018

(30) Foreign Application Priority Data

Dec. 21, 2016 (EP) .................................. 16205907

(51) Int. Cl.
| | |
|---|---|
| *G06F 3/045* | (2006.01) |
| *G06F 1/16* | (2006.01) |
| *G06F 3/0488* | (2013.01) |
| *G06F 3/01* | (2006.01) |
| *G06F 3/0487* | (2013.01) |
| *G06F 3/16* | (2006.01) |

(52) U.S. Cl.
CPC ............ *G06F 1/1694* (2013.01); *G06F 3/017* (2013.01); *G06F 3/0487* (2013.01); *G06F 3/0488* (2013.01); *G06F 3/165* (2013.01); *G06F 3/167* (2013.01); *G06F 2200/1636* (2013.01); *G06F 2200/1637* (2013.01); *H04R 2400/01* (2013.01)

(58) Field of Classification Search
USPC ............ 345/156, 173, 174; 381/150; 700/19
See application file for complete search history.

(56) References Cited

U.S. PATENT DOCUMENTS

| 7,274,716 B2 | 9/2007 | Hochschild | |
|---|---|---|---|
| 2005/0125083 A1* | 6/2005 | Kiko | ...................... G05B 15/02 700/19 |

(Continued)

FOREIGN PATENT DOCUMENTS

| EP | 2584459 A1 | 4/2013 |
|---|---|---|
| WO | WO-2016/032732 A1 | 3/2016 |

*Primary Examiner* — Thuy N Pardo

(57) ABSTRACT

A motion-detection-circuit configured to receive an audio-output-signal and a received-motion-signal. The motion-detection-circuit includes a preliminary-motion-detector configured to process the received-motion-signal in order to set a state of a prelim-motion-detected-signal based on the received-motion-signal; and an ADC for providing an ADC-output-signal that is a digital representation of a signal received at an ADC-input-terminal. The motion-detection-circuit also includes a switch configured to connect either (i) an audio-output-receiver or (ii) a motion-signal-receiver-terminal to the ADC-input-terminal based on the state of the prelim-motion-detected-signal. The motion-detection-circuit further includes a digital-motion-detector configured to, based on the state of the prelim-motion-detected-signal, process the ADC-output-signal in order to set a state of a motion-detection-signal; and a digital-audio-processor configured to, based on the state of the prelim-motion-detected-signal, process the ADC-output-signal in order to provide an audio-input-signal for an audio-output-module.

15 Claims, 1 Drawing Sheet

(56) References Cited

U.S. PATENT DOCUMENTS

| | | | | |
|---|---|---|---|---|
| 2005/0275637 | A1* | 12/2005 | Hinckley | A63F 13/06 345/173 |
| 2009/0244031 | A1* | 10/2009 | Westerman | G06F 3/0235 345/174 |
| 2013/0051567 | A1 | 2/2013 | Gipson | |
| 2015/0334477 | A1* | 11/2015 | Macours | G08B 3/10 381/150 |
| 2015/0338916 | A1* | 11/2015 | Priyantha | G06F 3/017 345/173 |

* cited by examiner

MOTION DETECTION CIRCUITS, AND ASSOCIATED METHODS

CROSS-REFERENCE TO RELATED APPLICATIONS

This application claims the priority under 35 U.S.C. § 119 of European patent application no. 16205907.5, filed Dec. 21, 2016 the contents of which are incorporated by reference herein.

The present disclosure relates to motion detection circuits, including tap-detection-circuits, and associated methods. Such motion detection circuits can be used to detect a tap (for example a short touch) on an electronic device, such as the touch screen of a smartphone.

According to a first aspect of the present disclosure there is provided a motion-detection-circuit comprising:
- an audio-output-receiver configured to receive an audio-output-signal;
- a motion-signal-receiver-terminal configured to receive a received-motion-signal;
- a preliminary-motion-detector configured to process the received-motion-signal in order to set a state of a prelim-motion-detected-signal based on the received-motion-signal;
- an ADC having:
  - an ADC-input-terminal; and
  - an ADC-output-terminal configured to provide an ADC-output-signal that is a digital representation of a signal received at the ADC-input-terminal;
- a switch configured to connect either (i) the audio-output-receiver or (ii) the motion-signal-receiver-terminal to the ADC-input-terminal based on the state of the prelim-motion-detected-signal;
- a digital-motion-detector configured to, based on the state of the prelim-motion-detected-signal, process the ADC-output-signal in order to set a state of a motion-detection-signal; and
- a digital-audio-processor configured to, based on the state of the prelim-motion-detected-signal, process the ADC-output-signal in order to provide an audio-input-signal for an audio-output-module.

In one or more embodiments, if the state of the prelim-motion-detected-signal is representative of "potential-motion-detected", then the digital-audio-processor is configured to provide an audio-input-signal that is representative of a failsafe mode of operation of the audio-output-module.

In one or more embodiments the switch is configured to connect:
- (i) the audio-output-receiver to the ADC-input-terminal if the state of the prelim-motion-detected-signal is representative of "no-potential-motion-detected"; or
- (ii) the motion-signal-receiver-terminal to the ADC-input-terminal if the state of the prelim-motion-detected-signal is representative of "potential-motion-detected".

In one or more embodiments the digital-motion-detector is configured to process the ADC-output-signal in order to set a state of a motion-detection-signal if the state of the prelim-motion-detected-signal is representative of "potential-motion-detected".

In one or more embodiments the digital-audio-processor is configured to process the ADC-output-signal in order to provide the audio-input-signal for the audio-output-module if the state of the prelim-motion-detected-signal is representative of "no-potential-motion-detected".

In one or more embodiments the digital-audio-processor is configured to:
- if the state of the prelim-motion-detected-signal is representative of "potential-motion-detected", provide an audio-input-signal for the audio-output-module that is independent of the ADC-output-signal; and
- if the state of the prelim-motion-detected-signal is representative of "no-potential-motion-detected", process the ADC-output-signal in order to provide an audio-input-signal to the audio-output-module that is based on the ADC-output-signal.

In one or more embodiments the preliminary-motion-detector comprises a comparator. The comparator may be configured to compare: (i) a signal level of the received-motion-signal, with (ii) a potential-motion-threshold-level, and set the state of the prelim-motion-detected-signal based on the result of the comparison.

In one or more embodiments the motion-detection-circuit further comprises a programmable-gain-amplifier configured to:
- apply a gain to the received motion-signal, and
- provide an amplified-received-motion-signal to the switch, such that the switch is configured to connect either (i) the audio-output-receiver or (ii) the amplified-motion-signal-receiver-terminal to the ADC-input-terminal based on the state of the prelim-motion-detected-signal.

In one or more embodiments the digital-motion-detector is configured to disable the programmable-gain-amplifier if the state of the prelim-motion-detected-signal is representative of "no-potential-motion-detected".

In one or more embodiments the motion-detection-circuit further comprises an audio-output-module configured to: receive the audio-input-signal from the digital-audio-processor; and provide the audio-output-signal to the audio-output-receiver.

In one or more embodiments the motion-detection-circuit further comprises a motion-signal-receiver-module configured to provide the received-motion-signal to the motion-signal-receiver-terminal.

In one or more embodiments the motion-signal-receiver-module is a speaker that is to operable as a microphone, a vibrator or an accelerometer.

There may be provided a tap-detection-circuit comprising any motion-detection-circuit disclosed herein.

According to a further aspect of the present disclosure, there is provided a method comprising:
- receiving an audio-output-signal;
- receiving a received-motion-signal;
- processing the received-motion-signal in order to set a state of a prelim-motion-detected-signal based on the received-motion-signal;
- connecting either (i) the audio-output-receiver or (ii) the motion-signal-receiver-terminal to an ADC-input-terminal based on the state of the prelim-motion-detected-signal;
- providing an ADC-output-signal that is a digital representation of a signal received at the ADC-input-terminal;
- based on the state of the prelim-motion-detected-signal, processing the ADC-output-signal in order to set a state of a motion-detection-signal; and
- based on the state of the prelim-motion-detected-signal, processing the ADC-output-signal in order to provide an audio-input-signal for an audio-output-module.

There may be provided an electronic device, such as a mobile telephone or smart phone, that includes any motion-detection-circuit disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

Motion detection circuits can process sounds in order to detect motion. For example, a tap (short touch) on or near a device, such as on the touchscreen of a device, can be detected by processing the associated sound that is received at a microphone. This can be referred to as tap detection. The following description will be in relation to detecting taps. However, it will be appreciated that the tap detection functionality can be equally applied more generally to motion sensing/detection.

Devices that can have tap detection during audio playback can be advantageous in that uniform usage of a tap feature can be provided to a user. For instance, a tap can be used to wake up a device or to activate a display screen irrespective of whether or not audio is being played back. Such devices can include portable electronics devices such as mobile phones, smartphones, tablet computers, laptop computers, etc.

In examples disclosed herein, such tap detection can be provided for a system that has two speakers, such as a hands-free-speaker and a receiver-speaker. For instance, when the hands-free speaker is used for outputting audio, the receiver-speaker can be used for tap detection. Such tap detection makes use of the receiver-speaker as a microphone (speaker-as-a-microphone; SAM), and can be an efficient method of detecting a tap in terms of power consumption. As will be discussed below, the SAM can advantageously make use of an existing analogue to digital converter (ADC) that is also used as part of a circuit that provides the audio playback from the other speaker.

Figure 1:
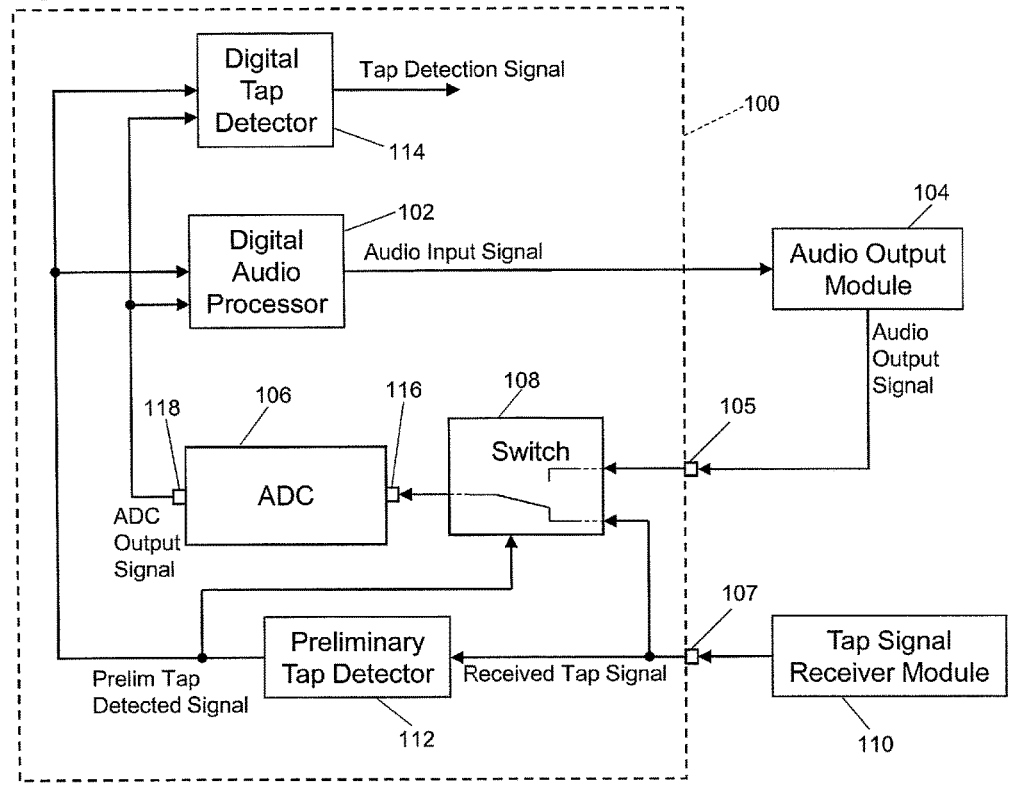
FIG. 1 shows an example embodiment of a tap-detection-circuit.

FIG. 1 shows an example embodiment of a motion-detection-circuit, which in this example is a tap-detection-circuit 100, that includes a digital-audio-processor 102 that provides an audio-input-signal to an audio-output-module 104. The audio-output-module 104, when in use, provides an audio-output-signal based on the audio-input-signal. The audio-output-signal is provided as feedback to an audio-output-receiver 105 of the tap-detection-circuit 100. The audio-output-receiver 105 may simply be an internal connection within an integrated circuit, or may be a connection to a component that is external to the integrated circuit. The audio-output-signal can be any signal that is representative of audio playback that is to be provided by a speaker (not shown). For example, the audio-output-signal can be representative of a signal that is provided to the speaker by an amplifier (not shown) in the audio-output-module 104, such that the speaker outputs music or a person's voice as part of a telephone conversation.

In a normal-mode-of-operation, the audio-output-signal is provided as feedback to the digital-audio-processor 102, via a switch 108 and an ADC 106. Such feedback can be used by the digital-audio-processor 102 to control the audio-input-signal such that the speaker is protected from damage. For example, during the audio playback, the ADC 106 can provide information about the output current of the audio-output-module to a speaker protection algorithm running on the digital-audio-processor 102. Such speaker protection algorithms are known in the art, and can include a SpeakerBoost algorithm.

The circuit of FIG. 1 also includes a motion-signal-receiver-terminal that receives a received-motion-signal, which in this example is a tap-signal-receiver-terminal 107 that receives a received-tap-signal from a tap-signal-receiver-module 110. The tap-signal-receiver-module 110 is an example of a motion-signal-receiver-module. The tap-signal-receiver-terminal 107 may simply be an internal connection within an integrated circuit, or may be a connection to a component that is external to the integrated circuit. In one example, the tap-signal-receiver-module 110 can include a speaker that is not actively being used to provide audio output. For example, if a hands-free-speaker is being controlled to provide audio output by the audio-output-module 104, then a receiver-speaker can be used as a microphone to provide the functionality of the tap-signal-receiver-module 110. That is, the received-tap-signal can be a microphone-signal provided by the receiver-speaker.

A preliminary-motion-detector, which in this example is a preliminary-tap-detector 112, processes the received-tap-signal in order to set a state of a prelim-tap-detected-signal based on the received-tap-signal. In this example, the preliminary-tap-detector 112 processes the received-tap-signal in the analogue domain in order to make a preliminary decision as to whether or not the received-tap-signal is likely to be indicative of a tap. That is, the state of the prelim-tap-detected-signal can be set as representative of "potential-tap-detected", which is indicative of a detected tap; or can be set as representative of "no-potential-tap-detected", which is indicative of no detected tap. This processing in the analogue domain may not be considered reliable enough to take the responsive action that should be performed if a tap has been detected (for example to activate a display screen), yet it may be considered reliable enough to initiate digital processing of the received-tap-signal to make a more reliable decision as to whether or not a tap has occurred. Such analogue-tap-detection-algorithms are known in the art, for example from patent publications US2015/0334477 A1 (NXP B.V.) and US2013/0051567 A1 (Gipson).

The prelim-tap-detected-signal is an example of a prelim-motion-detected-signal, which can have a state that is representative of "potential-motion-detected" or "no-potential-motion-detected".

Digital processing of the received-tap-signal will require conversion of the received-tap-signal from the analogue to the digital domain. However, in systems such as these, the ADC 106 can occupy a relatively large amount of area on a silicon chip, and can also be costly. Therefore, a more efficient and compact integrated circuit can be provided by avoiding a need to include a separate ADC for tap detection.

The inventors have found that the ADC 106 that is used in the feedback path of the audio-output-module 104 can be used to convert the received-tap-signal to the digital domain in response to the detection of a potential tap by the preliminary-tap-detector 112. Such processing can be considered as not having a too detrimental effect on the audio that is provided by the audio-output-module, whilst enabling tap detection without requiring another ADC.

When a potential tap is detected by the preliminary-tap-detector 112, and the state of the prelim-tap-detected-signal is set to "potential-tap-detected", the received-tap-signal is provided as an input to a digital-tap-detector 114 via the same switch 108 and ADC 106 that were used in the feedback loop for the digital-audio-processor 102. This can be considered as a tap-detection-mode of operation. The digital-tap-detector 114 is an example of a digital-motion-detector. The digital-tap-detector 114 can process the digital representation of the received-tap-signal in order to set a state of a tap-detection-signal. In some examples, the tap-detection-signal can set a flag on an Interrupt line that is provided to an associated host device for associated processing (such as to activate a display screen). The tap-detection-signal is an example of a motion-detection-signal.

The ADC 106 has an ADC-input-terminal 116 and an ADC-output-terminal 118. The ADC-output-terminal 118 provides an ADC-output-signal. Dependent on the state of the switch 108, the ADC-output-signal can be representative of either: (i) the audio-output-signal from the audio-output-module 104; or (ii) the received-tap-signal from the tap-signal-receiver-module 110.

The switch 108 is configured to connect either (i) the audio-output-receiver 105; or (ii) the tap-signal-receiver-terminal 107, to the ADC-input-terminal 116 based on the state of the prelim-tap-detected-signal. If the state of the prelim-tap-detected-signal is "potential-tap-detected", then the switch 108 connects the tap-signal-receiver-terminal 107 to the ADC-input-terminal 116. Alternatively, if the state of the prelim-tap-detected-signal is "no-potential-tap-detected", then the switch 108 connects the audio-output-receiver 105 to the ADC-input-terminal 116. In this way, the prelim-tap-detected-signal is used as a control signal for the switch 108 such that the ADC 106 can provide an output signal that is suitable for either: (i) providing feedback from the audio-output-module 104 to the digital-audio-processor 102; or (ii) providing a signal to the digital-tap-detector 114 such that it can determine whether or not a tap has occurred.

The digital-tap-detector 114 receives the prelim-tap-detected-signal and the ADC-output-signal as input signals, and provides the tap-detection-signal as an output signal. The digital-tap-detector 114 is configured to, based on the state of the prelim-tap-detected-signal, process the ADC-output-signal in order to set a state of the tap-detection-signal. In this example, the digital-tap-detector 114 is configured to only process the ADC-output-signal if the state of the prelim-tap-detected-signal is "potential-tap-detected". At all other times, the state of the tap-detection-signal is set as "no-tap-detected". When the digital-tap-detector 114 does process the ADC-output-signal, it can apply a digital-tap-detection-algorithm to the ADC-output-signal in order to set the state of the tap-detection-signal as either "tap-detected" or "no-tap-detected". Such digital-tap-detection-algorithms are known in the art.

The digital-audio-processor 102 also receives the prelim-tap-detected-signal and the ADC-output-signal as input signals, and provides the audio-input-signal as an output signal. The digital-audio-processor 102 is configured to, based on the state of the prelim-tap-detected-signal, process the ADC-output-signal in order to provide an audio-input-signal to the audio-output-module 104. In this example, if the state of the prelim-tap-detected-signal is "potential-tap-detected", then the digital-audio-processor 102 provides an audio-input-signal that is independent of the ADC-output-signal. That is, the feedback loop is interrupted and the digital-audio-processor 102 can generate the audio-input-signal without taking any feedback into account. In one example, the digital-audio-processor 102 can cause the audio-input-module 104 to operate in a failsafe mode of operation if the state of the prelim-tap-detected-signal is "potential-tap-detected". This will mean that the audio-output-module 104 will not benefit from any enhanced processing that can be performed when feedback is used. However, if the audio-input-module 104 operates in the failsafe mode of operation for only a short time (for example a few seconds), then a user may not easily be able identify a degradation in audio quality.

If the state of the prelim-tap-detected-signal is "no-potential-tap-detected", then the digital-audio-processor 102 processes the ADC-output-signal in order to provide an audio-input-signal that is based on the ADC-output-signal. That is, the feedback loop from the audio-output-module 104 to the digital-audio-processor 102 is used such that enhanced audio can be provided by the audio-output-module 104, as discussed above.

In this way, the inputs and optionally the outputs of the ADC can be switched based on an event, which can be detected by a preliminary-tap-detector such as a tap comparator. Advantageously, the ADC can therefore be shared asynchronously. When an event is detected, the speaker/tap algorithms can be notified such that, for example, the speaker algorithm stops accepting incoming data (which can be considered acceptable if it is only for a short time, such as a few seconds) whilst still enabling adequate speaker protection for a short period of time, during which time the tap algorithm can take over. Inquiring of the tap pattern can take few seconds depending on its complexity.

Figure 2:
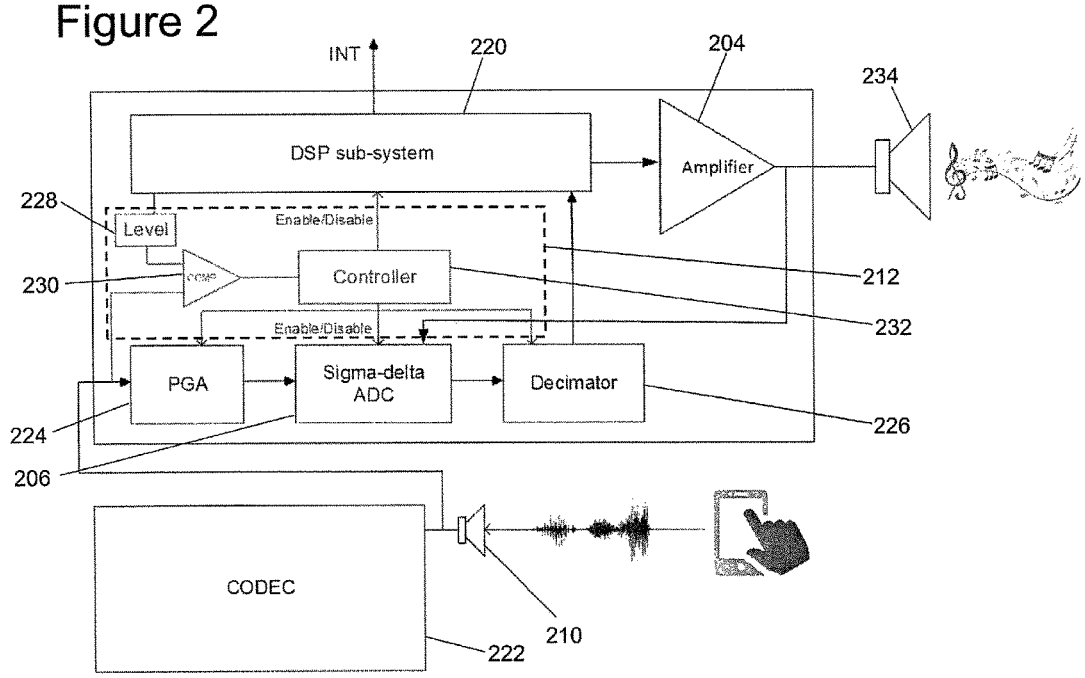
FIG. 2 shows another example embodiment of a tap-detection-circuit.

FIG. 2 shows another example embodiment of a tap-detection-circuit. In this example, a hands-free-speaker 234 is being used to provide music as audio output. A DSP-subsystem provides the functionality of a digital-audio-processor such that it can provide an audio-input-signal to an amplifier 204. The amplifier 204 can be considered as providing the functionality of an audio-output-module, in that it provides an audio-output-signal to the hands-free-speaker 234. The audio-output-signal is also provided as an input signal to an ADC, in this example a sigma-delta ADC 206. In this example, the functionality of a switch is embedded within the sigma-delta ADC 206 such that either the audio-output-signal or a received-tap-signal are converted into a digital signal that is provided at the ADC-output-terminal of the sigma-delta-ADC When the tap-detection-circuit is operating in a normal mode of operation, the sigma-delta ADC 206 converts the audio-output-signal to the digital domain, and provides an ADC-output-signal to an optional decimator 226. The decimator 226 can be used to reduce the sampling rate of a signal, if doing so is beneficial for the subsequent processing that will be performed by the DSP sub-system 220. Use of the decimator 226 can be particularly beneficial where the ADC is a sigma-delta ADC 206. In other examples, where the ADC is not a sigma-delta ADC 206, such as a flash or SAR ADC, the decimator 226 may not be required. The DSP sub-system 220 can then process the decimated digital representation of the audio-output-signal when generating the audio-input-signal for the hands-free-speaker 234, such that feedback is used to control the hands-free-speaker 234.

In this example, a receiver-speaker 210 is operated as a microphone, and provides at least part of the functionality of a tap-signal-receiver-module. The receiver-speaker 210 is shown as receiving a sound wave from a user tapping an electronic device, in this example a mobile telephone.

A CODEC 222 is shown as connected to the receiver-speaker 210, for coding and decoding information that is communicated with the receiver-speaker 210 when it is used to provide audio output, which is not the case for the remainder of this description. However, it will be appreciated that the functionality of the hands-free-speaker 234 and the receiver-speaker 210 can be reversed such that the receiver-speaker 210 is used to provide audio output, and the hands-free-speaker 234 is used as a microphone for detecting taps.

The receiver-speaker 210 is shown as providing a first input signal to a comparator 230 in a preliminary-tap-detector 212. A potential-tap-threshold-signal is provided as a second input signal to the comparator 232 from a level-setting-block 228. In this example, a controller 232 of the preliminary-tap-detector 212 can set the state of a prelim-tap-detected-signal as "potential-tap-detected" if the received-tap-signal from the receiver-speaker 210 exceeds a potential-tap-threshold-level (which is an example of a potential-motion-threshold-level) that is defined by the potential-tap-threshold-signal. The potential-tap-threshold-level can be set at a level that is high enough to result in the comparator 230 not being triggered by the audio output that is provided by the hands-free-speaker 234. The controller 232 then provides this prelim-tap-detected-signal (shown as "enable/disable" in FIG. 2) to the DSP sub-system 220, the sigma-delta ADC 206, the decimator 226, and an optional programmable-gain-amplifier (PGA) 224, as will be discussed below.

The operation of the decimator 226 can be controlled based on the "enable/disable" signal as follows. When the "enable/disable" is representative of "no-potential-tap-detected", the decimator is used to reduce the sampling rate of the signal received at its input in order to provide an output signal to the DSP sub-system 220 for processing as part of the feedback that is used to control the hands-free-speaker 234. When the "enable/disable" is representative of "potential-tap-detected", the decimator in this example is disabled such that the functionality for reducing the sampling rate is bypassed, and the ADC-output-signal is passed to the DSP sub-system 220 without a change in its sampling rate. This can be advantageous because at the moment that a potential tap is identified, the decimator 226 can still contain audio related data (that is, it can have memory effect). If this audio related data is processed by the tap algorithm on the DSP sub-system 220, then it can reduce the robustness of the tap algorithm. Therefore, bypassing the functionality of the decimator 226 when a potential tap is detected can clear/skip the audio data. In some examples, this can also be achieved by introducing timestamping, such that the DSP sub-system 220 can (in)validate incoming data based on preliminary tap detection.

In some examples, the controller 232 can apply filtering to the output signal from the comparator 230 in order to suppress non-tap related peaks. For example, the controller 232 can includes a simple counter, which evaluates the comparator output signal for a given time and if the state of the comparator output signal persists for the given time, then the controller tags it as a potential candidate for the further processing by setting a state of the "enable/disable" signal as representative of "potential-tap-detected". In this way, high frequency noise can be suppressed.

When the preliminary-tap-detector 212 does not determine a potential tap, it sets the state of the prelim-tap-detected-signal ("enable/disable" signal in the figure) as "no-potential-tap-detected" such that:
 the PGA 224 is disabled. In this example, the PGA 224 is only required when the DSP sub-system is to provide the functionality of a digital-tap-detector. Therefore disabling the PGA 224 when it is not required can be power efficient;
 the sigma-delta ADC 206 converts the audio-output-signal from the amplifier 204 into the digital domain, and provides that digital signal to the decimator 226; and
 the DSP sub-system 220 processes the output signal from the decimator 226 as feedback when generating the audio-input-signal for the amplifier 204.

When the preliminary-tap-detector 212 determines a potential tap, it sets the state of the prelim-tap-detected-signal ("enable/disable" signal in the figure) as "potential-tap-detected" such that:
 the PGA 224 is enabled. When the PGA 224 is enabled, it applies a gain to the received tap-signal, and provides an amplified-received-tap-signal (which is an example of an amplified-received-motion-signal) as an input signal to the sigma-delta ADC 206;
 the sigma-delta ADC 206 converts the amplified-received-tap-signal from the PGA 224 into the digital domain, and provides that digital signal to the decimator 226; and
 the DSP sub-system 220:
  processes the output signal from the decimator 226 in order to provide the functionality of a digital-tap-detector and set the state of a tap-detection-signal, which is shown as INT in FIG. 2; and
  operates the amplifier 204 in a failsafe mode of operation, without using any feedback and therefore independently of the ADC-output-signal from the sigma-delta ADC 206.

When the preliminary-tap-detector 212 changes the state of the prelim-tap-detected-signal, it should not generate artefacts in the ADC-output-signal, such as overshoots or oscillations/variations in the signal, that can be caused by a DC offset change or by a remaining garbage data. In this way, portions of the ADC-output-signal that correspond to a digital representation of the audio-output-signal should not be processed by the DSP sub-system 220 when applying a digital-tap-detection-algorithm to the ADC-output-signal. Similarly, portions of the ADC-output-signal that correspond to a digital representation of the received-tap-signal should not be processed by an audio-algorithm on the DSP sub-system 220 when generating the audio-input-signal for the hands-free-speaker 234. One way in which the system of FIG. 2 can address such artefacts is to disable the decimator, as discussed above, in order to reduce the likelihood of undesired memory effects. The ADC can has also have a memory effect, although it may be shorter, such as 10 clock cycles. Also, timestamping can be used to identify portions of the ADC-output-signal for processing either by the audio-algorithm or the digital-tap-detection-algorithm, based on the time that the state of the "enable/disable" signal changes.

In a similar way to FIG. 1, the example embodiment of FIG. 2 can advantageously share an ADC resource based on asynchronous events that are identified using a tap comparator 230.

One or more of the examples disclosed herein can enable an ADC to be used asynchronously to either: (i) provide feedback for audio processing; or (ii) convert a receivedtap-signal to the digital domain, such that the digital domain signal can be processed to determine whether or not a tap has been made by a user. In this way, a separate ADC is not required for the tap detection, which would increase the silicon area required to implement the tap detection functionality. Also, such asynchronous operation can be considered to provide advantages over using a (synchronously) multiplexed ADC, because such a multiplexed ADC may require anti-aliasing filters and modifications to an existing ADC that is already used as part of the audio circuit's feedback loop, and also may increase the silicon area required by more than is necessary to implement a simple switch. Furthermore, by continuing to operate the audio circuit whilst tap detection is being performed, optionally in a failsafe mode of operation, it is not necessary to interrupt the audio playback in order for the ADC to be used for tap detection.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A motion-detection-circuit comprising:
an audio-output-receiver configured to be coupled to an audio-output speaker and receive an audio-output-signal configured to be sent to the audio-output speaker;
a motion-signal-receiver-terminal configured to receive a received-motion-signal;
a preliminary-motion-detector configured to process the received-motion-signal in order to set a state of a prelim-motion-detected-signal based on the received-motion-signal;
an ADC having:
an ADC-input-terminal; and
an ADC-output-terminal configured to provide an ADC-output-signal that is a digital representation of a signal received at the ADC-input-terminal;
a two-state switch configured in a first state to connect (i) the audio-output-receiver to the ADC-input-terminal and in a second state to connect (ii) the motion-signal-receiver-terminal to the ADC-input-terminal wherein the first and second states are based on the state of the prelim-motion-detected-signal;
a digital-motion-detector configured to, based on the state of the prelim-motion-detected-signal, process the ADC-output-signal in order to set a state of a motion-detection-signal; and
a digital-audio-processor configured to, based on the state of the prelim-motion-detected-signal, process the ADC-output-signal in order to provide an audio-input-signal for an audio-output-module.

2. The motion-detection-circuit of claim 1,
wherein, if the state of the prelim-motion-detected-signal is representative of "potential-motion-detected", then the digital-audio-processor is configured to provide an audio-input-signal that is representative of a failsafe mode of operation of the audio-output-module.

3. The motion-detection-circuit of claim 1, wherein the switch is configured to connect:
(i) the audio-output-receiver to the ADC-input-terminal if the state of the prelim-motion-detected-signal is representative of "no-potential-motion-detected"; or
(ii) the motion-signal-receiver-terminal to the ADC-input-terminal if the state of the prelim-motion-detected-signal is representative of "potential-motion-detected".

4. The motion-detection-circuit of claim 1,
wherein the digital-motion-detector is configured to process the ADC-output-signal in order to set a state of a motion-detection-signal if the state of the prelim-motion-detected-signal is representative of "potential-motion-detected".

5. The motion-detection-circuit of claim 1,
wherein the digital-audio-processor is configured to process the ADC-output-signal in order to provide the audio-input-signal for the audio-output-module if the state of the prelim-motion-detected-signal is representative of "no-potential-motion-detected".

6. The motion-detection-circuit of claim 1, wherein the digital-audio-processor is configured to:
if the state of the prelim-motion-detected-signal is representative of "potential-motion-detected", provide an audio-input-signal for the audio-output-module that is independent of the ADC-output-signal; and
if the state of the prelim-motion-detected-signal is representative of "no-potential-motion-detected", process the ADC-output-signal in order to provide an audio-input-signal to the audio-output-module that is based on the ADC-output-signal.

7. The motion-detection-circuit of claim 1,
wherein the preliminary-motion-detector comprises a comparator, and wherein the comparator is configured to compare: (i) a signal level of the received-motion-signal, with (ii) a potential-motion-threshold-level, and set the state of the prelim-motion-detected-signal based on the result of the comparison.

8. The motion-detection-circuit of claim 1, further comprising a programmable-gain-amplifier configured to:
apply a gain to the received motion-signal, and
provide an amplified-received-motion-signal to the switch, such that the switch is configured to connect either (i) the audio-output-receiver or (ii) the amplified-motion-signal-receiver-terminal to the ADC-input-terminal based on the state of the prelim-motion-detected-signal.

9. The motion-detection-circuit of claim 8,
wherein the digital-motion-detector is configured to disable the programmable-gain-amplifier if the state of the prelim-motion-detected-signal is representative of "no-potential-motion-detected".

10. The motion-detection-circuit of claim 1,
further comprising an audio-output-module configured to:
receive the audio-input-signal from the digital-audio-processor; and
provide the audio-output-signal to the audio-output-receiver.

11. The motion-detection-circuit of claim 1,
further comprising a motion-signal-receiver-module configured to provide the received-motion-signal to the motion-signal-receiver-terminal.

12. The motion-detection-circuit of claim 11,
wherein the motion-signal-receiver-module is a speaker that is operable as a microphone, a vibrator or an accelerometer.

13. A tap-detection-circuit comprising the motion-detection-circuit of claim 1.

14. A method comprising:
receiving an audio-output-signal configured to be sent to an audio-output speaker;
receiving a received-motion-signal;
processing the received-motion-signal in order to set a state of a prelim-motion-detected-signal based on the received-motion-signal;
connecting (i) the audio-output-receiver to an ADC-input-terminal if a two-state switch is in a first state and connecting (ii) the motion-signal-receiver-terminal to the ADC-input-terminal if the two-state switch is in a second state wherein the first and second states are based on the state of the prelim-motion-detected-signal;
providing an ADC-output-signal that is a digital representation of a signal received at the ADC-input-terminal;
based on the state of the prelim-motion-detected-signal, processing the ADC-output-signal in order to set a state of a motion-detection-signal; and
based on the state of the prelim-motion-detected-signal, processing the ADC-output-signal in order to provide an audio-input-signal for an audio-output-module.

15. An electronic device including the motion-detection-circuit of claim 1.

* * * * *